United States Patent

Slavin

[15] 3,641,554
[45] Feb. 8, 1972

[54] DISPLAY SYSTEM

[72] Inventor: Peter E. Slavin, Winchester, Mass.

[73] Assignee: Intelligent Instruments, Inc., Winchester, Mass.

[22] Filed: Jan. 9, 1970

[21] Appl. No.: 1,584

[52] U.S. Cl. .......................340/324 A, 324/121, 340/151, 340/212
[51] Int. Cl. ..........................................G08b 5/22
[58] Field of Search............................340/324 A, 212, 413

[56] References Cited

UNITED STATES PATENTS

| | | | |
|---|---|---|---|
| 3,298,013 | 1/1967 | Koster | 340/324 A |
| 3,375,509 | 3/1968 | Mullarkey | 340/324 A X |
| 3,406,387 | 10/1968 | Werme | 340/324 A |
| 3,324,458 | 6/1967 | MacArthur | 340/324 A X |
| 3,469,252 | 9/1969 | Bet | 340/324 A |
| 3,474,438 | 10/1969 | Lauher | 340/324 A |

*Primary Examiner*—David L. Trafton
*Attorney*—Morse, Altman & Oates

[57] ABSTRACT

Analog data from a number of sources are converted to digital form and stored in a memory unit having a plurality of channels. Any channel of digital data may be retrieved selectively and converted back into analog form to operate a cathode-ray tube which will graphically display the original data as a trace, the deflection in one direction representing the magnitude of the quantity and the deflection in the other direction representing time.

2 Claims, 3 Drawing Figures

PATENTED FEB 8 1972

3,641,554

INVENTOR
PETER E. SLAVIN
BY
Morse, Altman & Oates
ATTORNEYS

DISPLAY SYSTEM

BACKGROUND OF THE INVENTION

1. Field of the Invention

This invention relates generally to graphic display systems and more particularly is directed towards a new and improved system for storing and selectively displaying operational data from a plurality of sources.

2. Description of the Prior Art

In power utility systems, refineries and other facilities of this nature, operating data from remote sources are brought to a control center for monitoring by operators. By way of example, the megawatts from a power generator may be telemetered to the control center and there displayed on a meter or on a strip chart. Operators tend to favor strip charts over meters as a display medium for the reason that the chart provides a record of past operation as well as present indication of a monitored condition. In addition, operators find it useful to be able to review the visible recent history of the monitored condition since they can observe trends and understand better how the present reading developed.

Where the control center monitors a large number of inputs the use of one strip chart per input becomes impractical by reason of the sheer bulk and use of a vast area of operator display panel. Also, the loss in accuracy due to the well-known "dead-band" and undershoot overshoot characteristics of such charts are further drawbacks in the use of such charts. Another disadvantage in the use of strip charts is that highly skilled electromechanical maintenance is required to insure continued and precise operation of the units. The strip charts also produce a large number of bulky records which present a storage problem and, at present, there is no automatic means to retrieve the reading for any particular period of operation. Finally, the use of chart records involves inherent difficulties whenever comparisons are to be made.

Accordingly, it is an object of the present invention to provide improvements in the reception and display of data from a plurality of sources. It is another object of this invention to provide a single display unit adapted to present graphically selected information from a plurality of sources.

SUMMARY OF THE INVENTION

This invention features a novel system for receiving, storing and displaying input data from a plurality of channels, comprising a multiplexer switching unit adapted to receive input signals from a plurality of channels, memory means connected to the multiplexer for storing incoming signals, retrieval means connected to the memory means for selectively retrieving the stored signals from the memory means and a cathode-ray tube connected to the retrieval means for selectively displaying in graphic form the data from one or more channels.

DETAILED DESCRIPTION OF THE PREFERRED EMBODIMENT

Figure 1:
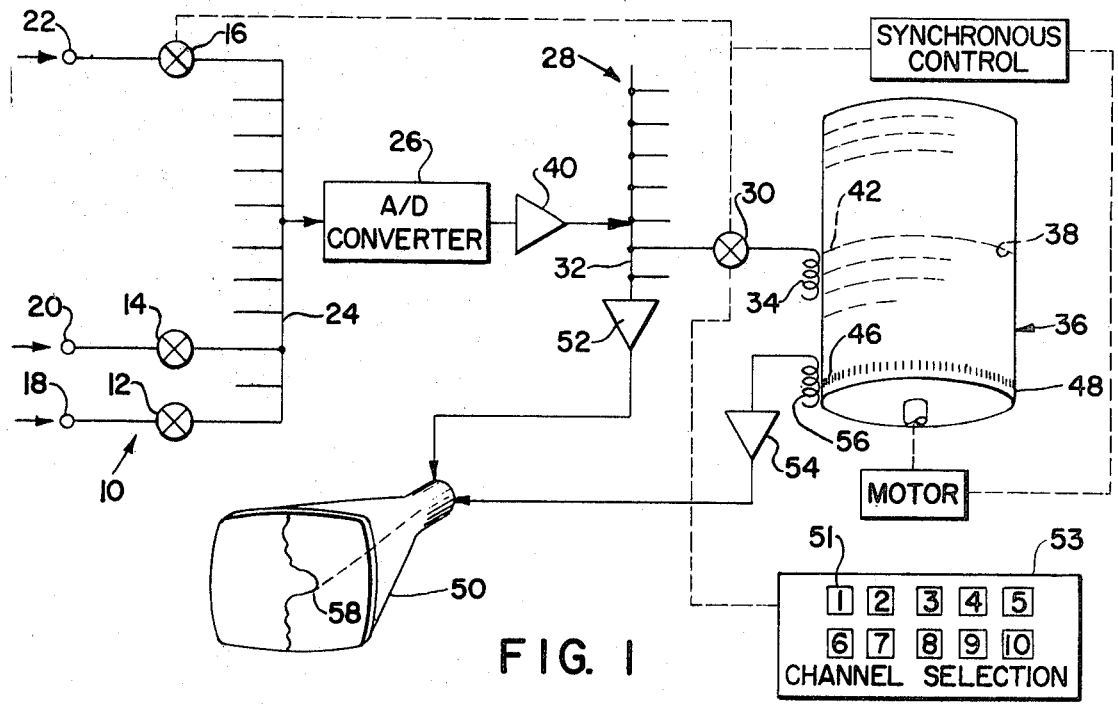

Referring now to the drawings and to FIG. 1 in particular, a multiplexing unit 10 comprised of a plurality of sequentially operated switches 12, 14 etc., receives analog input signals from a plurality of channels at input contacts 18, 20 etc., for delivery to a common bus 24. Each associated switch, input contact and lead defines an input channel through which data from a remote location is fed into a common center. The switches 12, 14, etc., comprise part of a multiplexing unit in which the switches open and close in sequence so that information from one channel at a time passes through the multiplexer. In practice, the switch 12, for example, will close first for a period of about 15 microseconds, during which time the analog input signal delivered through the switch 12 to the bus 24 will pass through an analog-to-digital converter 26, common to all channels, and will be converted into binary digits or bits for one sample having an accuracy of 0.1 percent. Once the switch 12 opens, the next switch 14 closes for the same period of time so that information in that particular channel will pass through the converter 26. The multiplexer switch continues to operate by opening and closing all switches in sequence so that each channel will be monitored on a repetitive sequential basis. There are N channels of input information and in the typical installation 50 such channels will be provided. At the end of each cycle of the multiplexer a last switch 16 opens, leaving all of the switches open and the cycle will repeat starting with switch 12.

As the multiplexer switches open and close in sequence, address switches 28 open and close in sequence and in step with the switches of multiplexer 10. Thus an individual address switch 30 (a), 30 (b) etc., in the switch array 28 closes for the same duration as its corresponding switch in the multiplexer 10 and it will be understood that each one of the group of the address switches 28 corresponds to a channel in the multiplexer.

Each individual address switch 30 (a), 30 (b), etc., in the group 28 is connected by appropriate leads between a common bus 32 and a read-write head 34 mounted in operative relation to a memory unit, which in the preferred embodiment includes a rotatable storage drum 36. The drum 36 is provided with a cylindrical magnetic recording surface to provide plurality of annular tracks or channels 38, one channel being associated with each read-write head 34. As each multiplexer switch and its related address switch are closed to form a channel, an input to that channel will match a particular track, as at 38, on the storage drum. During this sample time (typically 15 $\mu$s., eight bits at 25 $\mu$s. each) the digital sample at the read-write head 34 will be recorded by means of a write amplifier 40 via the closed address switch 30 and the head 34 onto a sample space 42 along the track 38.

At one cycle time later, such as 1 or 2 seconds, for example, the whole sequence of switch operation is repeated. Each track on the memory drum now has written on it a new sample, this sample being offset from the previous sample by one increment because the cycle was initiated when the drum position was one sample past its last position. This position is kept track of by means of a reference mark 46 or other permanent scribe marks on a timing track 48.

A set of samples thus can be written onto the drum 36 in much less than one cycle time, i.e., 1 millisecond as against two seconds. For the remainder of this cycle the drum is free to generate read information to produce a display on a cathode-ray tube 50.

An operator may select a particular channel or track to be displayed and for selection of a track such as 38 the switch 30 is closed by manually actuating an appropriate channel selection switch 51 located on a control board 53 or the like. Read amplifiers 52 and 54, connected respectively to the bus 32 and to a read head 56 for the timing track 48, thereby will be energized. The amplifier 52 includes digital-to-analog circuitry so that the digital data stored on the track 38 will be converted to an analog voltage to drive the horizontal deflection plates for the CRT 50 proportional to the samples being read. The amplifier 54 incorporates a counter and begins to count drum scribe lines 46 which are annular markers at the position "-present sample" and this count is converted to an analog voltage. This analog voltage, which increases uniformly with drum revolutions away from the "present sample" line, drives the vertical deflection plates representing time. For example, a light spot 58 has an X deflection in proportion to the sample which was written as digits on the drum several hours previous.

This tracing of a bright line on the face of the CRT 50 is repeated for each revolution of the drum 36, that is to say a 60-per-second "refresh" cycle is provided. The drum revolutions are a natural match for the usual refresh rate demanded.

Figure 2:
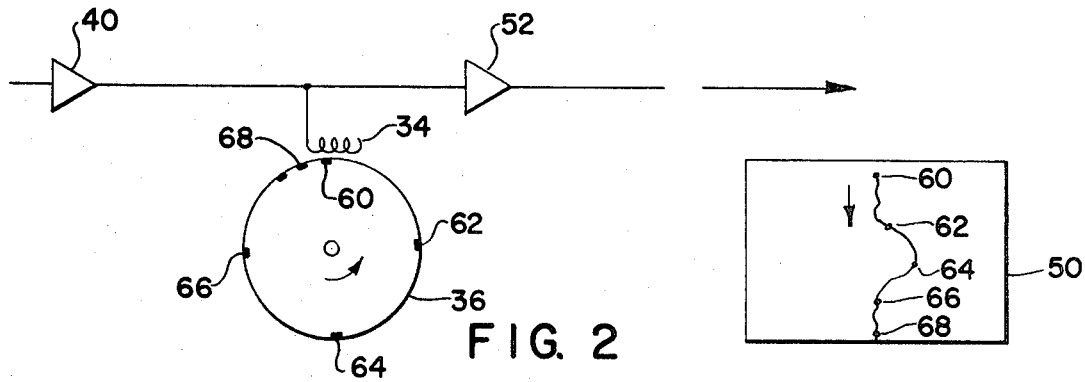
Figure 3:
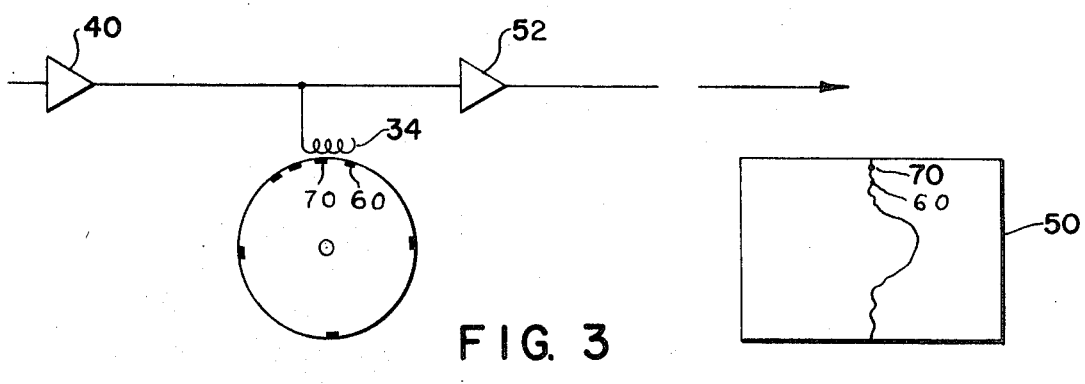

Referring now to FIGS. 2 and 3 of the drawings there are shown two positions of the drum 36 separated by one sample. Also shown in association with each figure is a CRT trace the points of which are correlated to points on the drum.

In FIG. 2 the drum 36 is shown in cross section and somewhat schematically with a track being represented on the periphery of the drum and recorded input data being represented by the spaced markings shown. On the drum track illustrated the latest or present sample is indicated by reference character 60. In operation, when reading the data from the memory drum 36, the readout amplifier 52 is on and this will convert the digital data from the track 38, for example, into the analog voltage required to operate the horizontal deflection plates of the cathode-ray tube 50 to represent amplitude of the signal from the selected channel. The sample 60 is shown as a spot at the top or starting position of the trace on the face of the tube 50. About one-fourth of the way down the scope face from the top and one-fourth of a drum revolution later another sample 62 appears as a spot. At the halfway mark a sample spot 64 is present, at the three-fourths position spot 66 is found and at the bottom there appears a sample spot 68. Them, almost at once, the scope spot is deflected upwardly to the starting position again and the process repeats with the next drum revolution (one-sixtieth of a second). In practice, there are typically more than 1,000 spots in each trace and with a suitable filter the trace line appears to be continuous in the manner illustrated. Each recorded bit on the drum is read out and changed to an analog signal and a horizontal deflection as the bit passes below the head 34.

In FIG. 3 one more sample has been written, for example, 2 seconds later, this sample 70 erases the previous last sample 68. It is thus evident that the sequence of spots on the scope trace is identical to FIG. 2 with the exception that the new sample 70 is at the top and the sample 68 on the bottom has disappeared. This is how the trace is continually brought up to the latest channel information to provide current display data.

The vertical deflection of the spot is timed to begin to go down as the latest sample passes the read head 34. This position shifts slightly each second and is kept track of by advancing the sector mark counter by one.

The drum is preferred for storing the several thousand samples from each telemetered channel for the reason that each head can be associated with a particular track and channel, using a fixed head bar construction and a multiplexer to select the heads. At each recording of a sample, which may be spaced at 1 or 10 seconds apart, the older set of samples is first erased. The newer set of samples are then written about the drum and the marker counter, triggered by the scribe lines on the drum, advances one step to mark the stop of the recording operation. The selection of a particular channel for the CRT displays involves only addressing the corresponding head as by a selector switch 51, routing via common read electronics into the digital-to-analog converters and applying the resulting voltage to the horizontal deflection circuit. The deflection consists of small steps smoothed by a capacity. At the same time the vertical deflection is moved one step on for each sample such that the sample spacing of the drum corresponds to the very small increment of voltage resulting from the counter which is driven by the mark lines on the timing track of the drum.

The drum is engaged in writing a fresh set of samples and erasing prior samples for only 1 or 2 milliseconds per cycle of drum rotation which typically may turn once per 17 $\mu$-sec. Nearly all of the turn time is used to read out the prerecorded data on the drum in order to refresh the trace on the CRT. A drum memory is particularly advantageous since the repeat rate on the trace is an ideal match for the turn rate of the drum, (e.g., 60 per second). Then, in this case the drum angular position has to be in synchronism with the vertical (time) deflection on the CRT.

The bits per track, using a 10-bit sample, will depend upon the spacing of the sample and the duration of the record. For example, given a sample each 10 seconds and 2,000 samples per track, a record of 5½ hours is provided. If there is a sample each 1 second, then one can expand the time scale to 30 minutes or less. The 1-second resolution is not required for a record of 1½ hours on a small CRT screen because the spot size will not allow this resolution. In this scheme the natural period of revolution of the drum matches the refresh interval desired.

Having thus described the invention what I claim and desire to obtain by Letters Patent of the United States is:

1. A display system comprising:
   a. a multiplexer including a plurality of switches each connected to a separate channel for receiving analog input signals from that channel;
   b. an analog-to-digital converter connected to said switches for converting said analog signals into digital signals, said switches adapted to open and close in cyclical sequence;
   c. a plurality of address switches corresponding in number to said multiplex switches and connected to said converter and adapted to open and close in cyclical sequence synchronously with said multiplex switches;
   d. memory means including a rotatable cylinder having a magnetic recording medium on its outer surface providing a plurality of axially spaced annular recording tracks corresponding in number to said multiplex switches and defining a like number of channels;
   e. a read-write head connected to each of said address switches and mounted in operative relation to a corresponding track;
   f. a digital-to-analog converter connected to said address switches;
   g. a cathode-ray tube connected to said digital-to-analog converter for presenting a display corresponding to said input signals;
   h. channel selection means connected to said address switches for selectively connecting a channel to said tube;
   i. a motor drivingly connected to said cylinder; and,
   j. control means connected to said multiplex switches, said address switches and said motor for synchronous operation thereof.

2. A display system according to claim 1 including a counter operatively associated with said other digital-to-analog converter.

* * * * *